United States Patent

[11] 3,613,109

[72] Inventor George J. Jarosz
Chicago, Ill.
[21] Appl. No. 850,437
[22] Filed Aug. 15, 1969
[45] Patented Oct. 12, 1971
[73] Assignee Admiral Corporation
Chicago, Ill.

---

[54] HORIZONTAL CONVERGENCE CIRCUIT

5 Claims, 5 Drawing Figs.

[52] U.S. Cl. .......... 315/13 C
[51] Int. Cl. .......... H01j 29/50
[50] Field of Search .......... 315/13 C

[56] References Cited

UNITED STATES PATENTS

| | | | |
|---|---|---|---|
| 2,903,622 | 9/1959 | Schopp | 315/13 (C) X |
| 3,163,797 | 12/1964 | Singleback | 315/13 C |
| 3,419,749 | 12/1968 | Gerstein | 315/13 (C) |

*Primary Examiner*—Malcolm F. Hubler
*Attorney*—Hill, Sherman, Meroni, Gross and Simpson

ABSTRACT: A horizontal convergence circuit for a color television receiver having at least first and second coils for magnetically converging a plurality of electron beams in a cathode-ray tube. The convergence circuit has a transformer which is coupled intermediate the two coils. This convergence transformer is coupled to the flyback transformer and is energized therefrom at the horizontal deflection rate. The two convergence coils are coupled in series with the secondary of the convergence transformer and have their polarities arranged in such a way so that the transformer produces series adding voltages across the coils. The convergence transformer has a movable core which allows the transformer to be adjusted to control the spacing between vertical test lines on the screen of the cathode-ray tube. A resistor is connected in parallel with the convergence coils and a variable tap on the resistor is coupled directly to a center tap on the secondary of the convergence transformer. This arrangement provides a differential amplitude control for the parabolic current in the coils. Further parallel connected resistors provide a differential tilt control and a master tilt control for the coils. The differential tilt control regulates the proportion of sawtooth current delivered to each coil, while the master tilt control regulates the amount of sawtooth delivered to both coils simultaneously. A single diode is coupled across both the coils and restores DC to allow the center of the parabola to be fixed at a given DC reference.

INVENTOR.
GEORGE J. JAROSZ

BY Hill, Sherman, Meroni, Gross & Simpson ATTORNEYS

HORIZONTAL CONVERGENCE CIRCUIT

BACKGROUND OF THE INVENTION

Convergence circuits are well known in the art and in conventional color television receivers are used to control the amount of parabolic and sawtooth currents delivered to convergence coils. As is well understood in the art, the sawtooth current is used to produce a tilt in the parabolic waveform to produce proper convergence of the three beams in a color television tube.

Convergence circuits heretofore employed have used a convergence transformer between the red and green convergence coils. The transformer, however, has been coupled so that the voltages developed by the red and green coils from the transformer have been in series opposition. The transformer was then used to control the separation between horizontal test lines on the screen, leaving only a master tilt control to regulate the separation between vertical test lines. It has been found however that this arrangement is not adequate to cover desirable production tolerances in the manufacturing of color tubes.

In addition, prior circuits have normally used a diode for each of the coils to fix the DC level of the parabolic current in the coils. Also, horizontal convergence circuits in the past have used variable inductors to control the amplitude of currents in the convergence coils. The use of separate diodes and the use of inductors have added undesirable cost to these convergence circuits.

FIELD OF THE INVENTION

The field of art to which this invention pertains is horizontal convergence circuits for color television receivers and in particular to convergence circuits for combining parabolic and sawtooth currents to produce proper convergence of the cathode-ray beams.

SUMMARY OF THE INVENTION

It is an important feature of the present invention to provide an improved horizontal convergence circuit.

It is another feature of the present invention to provide a horizontal convergence circuit which is less expensive to manufacture and which is useable with greater production tolerances than circuits heretofore used.

It is a principal object of the present invention to provide a horizontal convergence circuit wherein a pair of convergence coils are coupled in series with a convergence transformer, and the coils are connected to have a polarity which develops series adding voltages when energized by the transformer.

It is another object of the present invention to provide a horizontal convergence circuit having series adding convergence coils connected in parallel with a transformer and having a variable resistor coupled in parallel with the coils and connected to a center tap on the transformer.

It is also an object of the present invention to provide a horizontal convergence circuit having a pair of convergence coils coupled in series adding relationship with the secondary winding of a convergence transformer and having a single diode connected in parallel therewith to restore DC to both coils.

It is a further object of the present invention to provide a horizontal convergence circuit having a pair of convergence coils coupled in series adding relationship with the secondary winding of a convergence transformer wherein the convergence transformer has a movable core to control the spacing between vertical test lines on the cathode-ray screen.

It is an present object of the present invention to provide a horizontal convergence circuit as described above including a resistance coupled in parallel with the coils and having a movable tap associated with the resistors and coupled to circuit ground to provide an additional means for regulating the spacing between vertical test lines on the cathode-ray screen.

These and other objects, features and advantages of the invention will be readily apparent from the following description of a certain preferred embodiment thereof, taken in conjunction with the accompanying drawing, although variations and modifications may be effected without departing from the spirit and scope of the novel concepts of the disclosure.

DESCRIPTION OF THE PREFERRED EMBODIMENT

Figures 1, 2, 3, 4, 5:
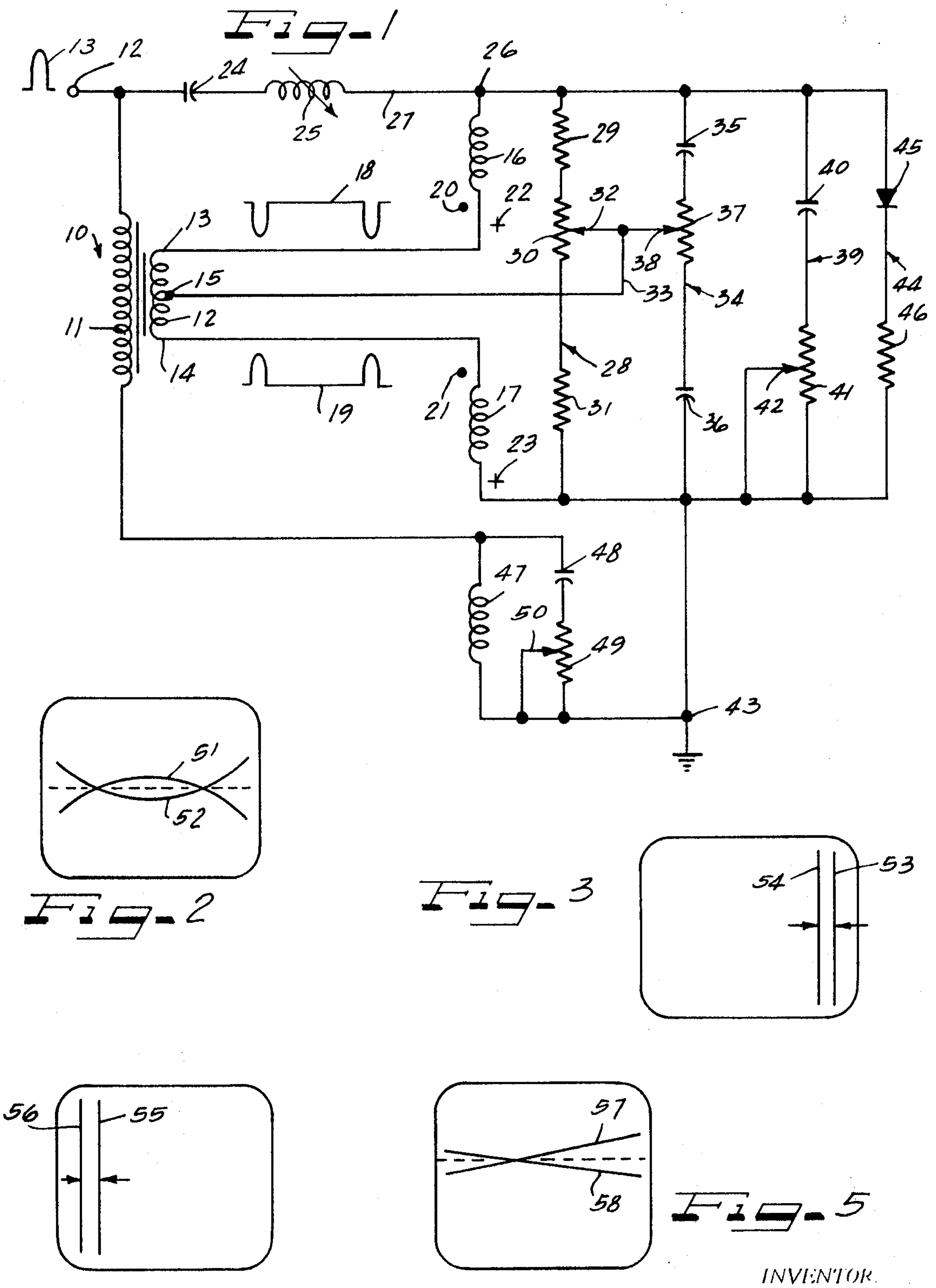
FIG. 1 is a schematic of a horizontal convergence circuit in accordance with the present invention showing the red and green convergence coils coupled in series adding relationship with a convergence transformer and indicating the various controls to regulate the spacing between vertical and horizontal test lines on a cathode-ray screen.
FIG. 2 is a schematic of a cathode-ray screen showing a pair of horizontal test lines on the screen which are misconverged due to an improper differential parabolic adjustment.
FIG. 3 is a schematic similar to FIG. 2 showing the misconvergence of vertical test lines on the left of a cathode-ray tube indicating misadjustment of a master tilt control in the present invention.
FIG. 5 is a schematic similar to FIG. 2 indicating nonconvergence of horizontal test lines on the cathode-ray screen indicating improper adjustment of a differential tilt control in the present invention.

The present invention utilizes a convergence transformer in series with a pair of convergence coils to regulate the spacing between vertical test lines in a color cathode-ray tube. The convergence coils are connected to be series additive with respect to the transformer, and in this way be varying the coupling of the secondary of the transformer to the primary, the spacing between the vertical lines can be set to be within the normal tube tolerances. Once the transformer coupling is fixed, the spacing between the vertical test lines can be controlled in each individual set by a master tilt control which is coupled in parallel with the convergence coils.

By the use of the series adding arrangement for the convergence coils, only a single diode is required to restore DC to both coils. This DC restoration is required to fix the base of the parabola to a given DC level to assure proper convergence. In addition, the present invention utilizes resistors in parallel with the convergence coils as differential parabolic amplitude and differential tilt amplitude controls.

It should be noted that in prior circuits, the convergence coils were coupled to be series opposing, and as such, the transformer was used to control the separation between horizontal test lines on the screen. This left inadequate control for the vertical test lines.

Referring to the drawings in greater detail, FIG. 1 shows a convergence transformer 10 having primary winding 11 which is coupled to the flyback transformer of the television receiver at a terminal 12. As is well understood, the flyback transformer supplies pulses at the horizontal deflection rate such as the pulse 13 to the convergence circuit.

The transformer 10 has a secondary winding 12 which has a pair of terminals 13 and 14 and a center tap 15. The terminal 13 is coupled to the red convergence coils 16, and the terminal 14 is coupled to the green convergence coil 17.

The output of the secondary winding 12 is shown at 18 and 19. The waveforms 18 and 19 are voltages derived directly from the transformer 10.

As well understood in the art, the polarity markings 20 and 21 of the red and green coils, respectively, indicate the direction of the voltage drop across the coil when a positive current enters the coils at the polarity marking. Since the voltages 18 and 19 are oppositely directed, the voltage 18 will produce a positive voltage as indicated at 22, and the voltage 19 will produce a positive voltage as indicated at 232. It can be seen that these voltages series adding.

The flyback transformer is coupled through a DC blocking capacitor 24 to an adjustable coil 25. The coil 25 is then coupled directly to the terminal 26 of the red convergence coil 16.

As shown, the coil 25 integrates the pulse 13, producing a sawtooth current in the line 17.

The red and green convergence coils 16 and 17 have a branch 28 connected in parallel therewith. The branch 28 consists of resistors 29, 30 and 31. The resistors 30 has a movable tap 32 associated therewith. The movable tap 32 is coupled through a line 33 to the center tap 15 of the secondary transformer winding 12.

A further branch 34 is connected in parallel with the coils and consists of capacitors 35 and 36 and a resistor 37. The resistor 37 also has a movable tap 38 associated therewith which is coupled through the line 33 to the center tap of the transformer winding 12.

The combination of the parallel branches 28 and 34 integrates the sawtooth current in the line 27 to produce a substantially parabolic current in the coils 16 and 17.

The voltage developed across the branch 28 will be substantially sawtooth in configuration. As is well understood, a sawtooth voltage across the coils 16 and 17 will integrate to produce a parabolic current in the coils. The movable tap 32 regulates the amount of sawtooth voltage applied across each of the respective coils 16 and 17 and according is a differential control for the parabolic current is current in the coils. By moving the tap 32 upwardly, more parabolic current is present in the coil 17 than in the coil 16. The reverse occurs when the tap 32 is moved downwardly.

The parallel branch 34 also has a substantially sawtooth voltage developed thereacross. However, the resistor 37 will develop a pulse voltage contribution to the coils 16 and 17. This pulse contribution of voltage then introduces a sawtooth current into the respective coils. The amount of this sawtooth current, of course; depends upon the position of the tap 38. Accordingly, the tap 38 acts as a differential tilt control adding more or less sawtooth current to the coils 16 and 17 depending upon the positioning of the tap with respect to the resistor 37.

A further branch 39 is coupled in parallel with the coils 16 and 17 and with the branches 28 and 34. The branch 39 has a capacitor 40 and a resistor 41 connected in series therewith. The resistor 42 has a movable tap 42 associated therewith which is coupled to circuit ground as at 43. Accordingly, the movable tap 42 acts as a master tilt control, regulating the amount of pulse voltage delivered across the coils 16 and 17. This in turn controls the amplitude of the sawtooth current in both the coils 16 and 17.

In addition, a further parallel branch 44 is provided which consists of a series connected diode 45 and resistor 46. The combination of resistance and diode provides DC restoration to assure that the proper DC level is established in the coils 16 and 17 to fix the position of the parabola 49 respect to a reference level.

A blue convergence coil 47 is shown to complete the circuit. The blue convergence coil 47 has a parallel branch consisting of a capacitor 48 and a resistor 49 together with a movable tap 50. The coil 47 is coupled between the primary of the transformer 10 and circuit ground at 43.

FIGS. 2 through 5 show various misconvergence tests on a cathode-ray screen. The configuration shown in FIG. 2 illustrates misconvergence between the red and green lines 51 and 52. The lines 51 and 52 can be brought into convergence by adjusting the movable tap 32.

In FIG. 3 vertical test lines are misconverged on the right hand side of the screen. These lines 53 and 54 may be converged by adjusting the coil 25. Adjustment of the coil 25 regulates the amount of parabolic current in both the coils 16 and 17. In the case of FIG. 2, adjustment of the tap 32 regulated only the relative amplitude of parabolic current between the coils 16 and 17, as explained.

In FIG. 4, vertical test lines 55 and 56 are misconverged. This misconvergence is adjusted by moving the tap 42 in FIG. 1. This regulated the amount of sawtooth current delivered to both the coils 16 and 17.

FIG. 5 shows misconverged horizontal test lines 57 and 58 which may be adjusted in FIG. 1 by moving the tap 38. This regulates the relative amplitude of sawtooth current delivered to the respective coils 16 and 17.

The adjustments 25, 32, 38, and 42 are used to "set up" the television receiver after it is assembled. However, by utilizing the transformer 10 in connection with the windings 16 and 17 as described in connection with FIG. 1, greater tolerances can be utilized in the production of receivers then has heretofore been possible. Also, the above circuit utilizes a single diode for DC restoration to both coils 16 and 17, and in addition is capable of utilizing resistors such as the resistors 29, 30 and 31 to control the amplitude of parabolic current delivered to the coils 16 and 17.

I claim:

1. A horizontal convergence circuit comprising:
   a transformer having primary and secondary windings, first and second convergence coils coupled in series with one of said transformer windings said first and second convergence coils being wound with such a polarity as to produce series additive voltages when energized by said transformer,
   a center tap being provided on said one transformer winding,
   a resistance being coupled in parallel with said first and second convergence coils,
   said resistance having a movable tap, and
   said movable tap being coupled to said center tap of said one transformer winding.

2. A horizontal convergence circuit in accordance with claim 1 wherein a branch having a series capacitor and resistor is coupled in parallel with said first and second convergence coils, and wherein said resistance has a movable tap which is coupled to the center tap of said transformer.

3. In a color television receiver having first and second convergence coils for converging a plurality of electron beams in a cathode-ray screen, a convergence circuit comprising:
   a convergence transformer and means for coupling the same to a source of pulse energy at the horizontal sweep frequency.
   said convergence transformer having a primary and a secondary winding,
   the secondary of said transformer being coupled in series with both said convergence coils in such polarity as to cause said convergence coils to produce series adding voltages when energized by said transformer,
   differential means associated with
   differential said convergence coils for simultaneously increasing the energy supplied to one of said coils while decreasing the energy supplied to the other coil, and
   said differential means comprising an impedance connected across both said coils,
   said impedance having a variable position tap associated therewith and coupled to a center tap on said transformer secondary winding.

4. A convergence circuit in accordance with claim 3 wherein said transformer has a variable position core and wherein said impedance comprises a resistance.

5. A convergence circuit in accordance with claim 3 wherein an additional impedance is coupled in parallel with said convergence coils, said impedance being provided with a variable tap and means for shunting said variable tap to circuit ground to provide a master amplitude control for said convergence coils.

UNITED STATES PATENT OFFICE

CERTIFICATE OF CORRECTION

Patent No. 3,613,109 Dated October 12, 1971

Inventor(s) George J. Izrosz

It is certified that error appears in the above-identified patent and that said Letters Patent are hereby corrected as shown below:

Col. 1, line 68; --additional-- should be inserted for "present" (first occurrence).
Col. 2, line 17; after "miscon-" insert --vergence of vertical test lines at the right hand side of a cathode ray screen and in the present invention indicating a misadjustment of a master parabolic control.
Figure 4 is a schematic similar to Figures 2 and 3 showing miscon- --;
line 60; "coils" should read --coil--;
line 68; "coils" should read --coil--;
line 71; "232" should read --23--.
Col. 3, line 2 ; "17" should read --27--;
line 5 ; "resistors" (second occurrence) should read --resistor--;
line 22; "according" should read --accordingly--;
line 23; "is current" should be deleted;
line 40; "resistor 42" should read --resistor 41--;
line 50; "49" should read --with--.
Col. 4, line 44; "frequency." should read --frequency,--;
line 52; "differential" should read --both--.

Signed and sealed this 10th day of April 1973.

(SEAL)
Attest:

EDWARD M.FLETCHER,JR.
Attesting Officer

ROBERT GOTTSCHALK
Commissioner of Patents